United States Patent

Schultz

[15] 3,671,928

[45] June 20, 1972

[54] AUTOMATICALLY ENERGIZABLE SONOBUOY

[72] Inventor: James F. Schultz, Dallas, Tex.

[73] Assignee: Aquatronics, Dallas, Tex.

[22] Filed: May 21, 1970

[21] Appl. No.: 39,362

[52] U.S. Cl. .................................. 340/2, 9/8 R, 340/2
[51] Int. Cl. .................................................. H04b 1/59
[58] Field of Search ........................... 340/2, 7 R; 9/8 R

[56] References Cited

UNITED STATES PATENTS

| | | | |
|---|---|---|---|
| 3,230,500 | 1/1966 | Dunn | 340/2 |
| 3,281,765 | 10/1966 | Taplin | 340/2 |
| 3,500,209 | 3/1970 | Fletcher et al. | 340/2 |
| 3,290,642 | 12/1966 | Mason et al. | 340/2 |
| 3,229,311 | 1/1966 | Maes | 340/2 |

Primary Examiner—Benjamin A. Borchelt
Assistant Examiner—H. A. Birmiel
Attorney—Richards, Harris & Hubbard

[57] ABSTRACT

A buoy housing includes flotation structure and an antenna movable from a retracted position inside the housing to an extended position outside the housing. An acoustic transducer is contained within a lower compartment in the housing and is attached to the housing by a flexible line. A transmitter is contained within the buoy housing and is operable to transmit from the antenna radio signals representative of acoustic signals received by the acoustic transducer. Structure is provided in the buoy housing which is responsive to contact with water for moving the antenna to the extended position and for lowering the acoustic transducer from the housing into the water for a preselected depth. A time delay device delays the lowering of the acoustic transducer from the housing for a predetermined time after the housing is placed in the body of water, in order to avoid entanglement of the acoustic transducer with towed streamers and the like.

11 Claims, 5 Drawing Figures 3,671,928
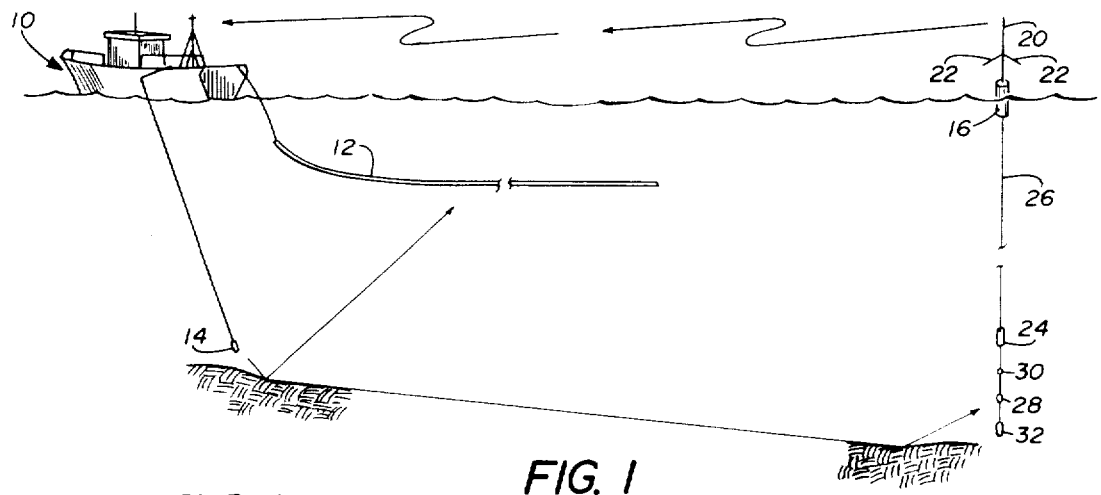
FIG. 1
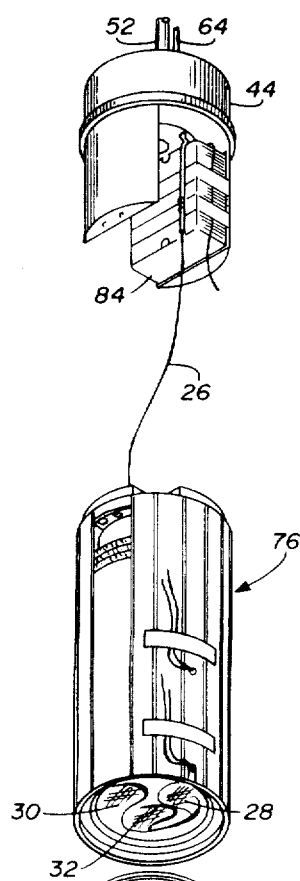
FIG. 5
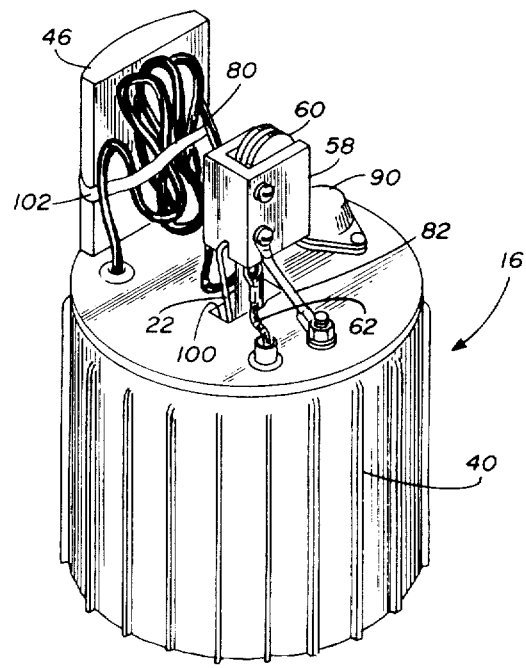
FIG. 4
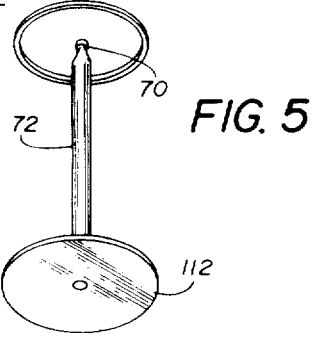
INVENTOR:
JAMES F. SCHULTZ
Richards, Harris & Hubbard
ATTORNEYS

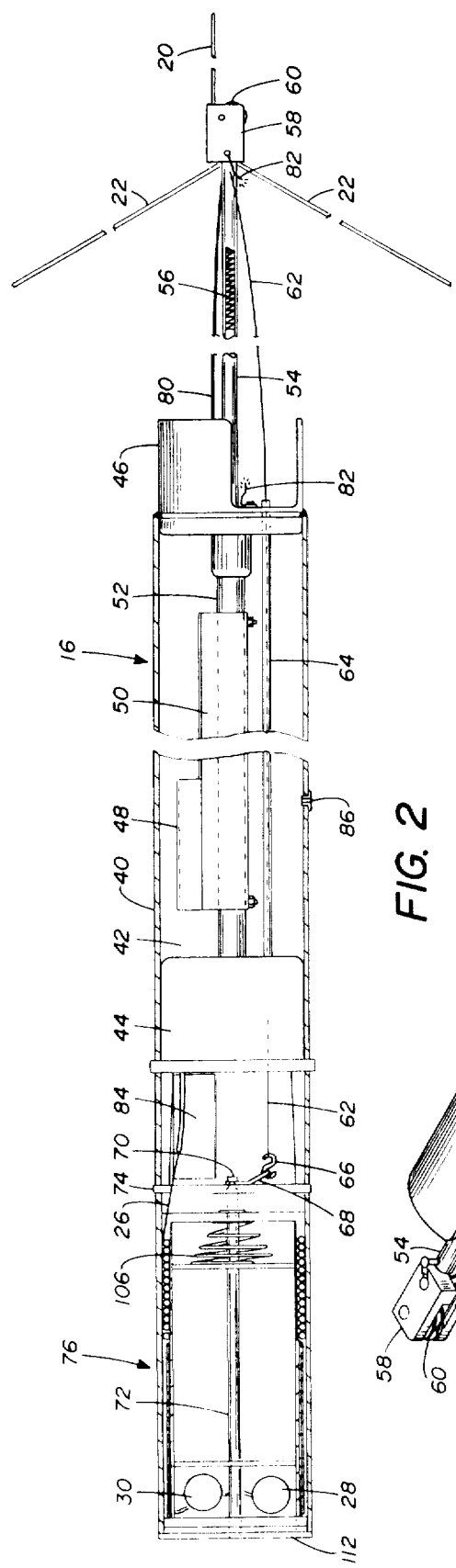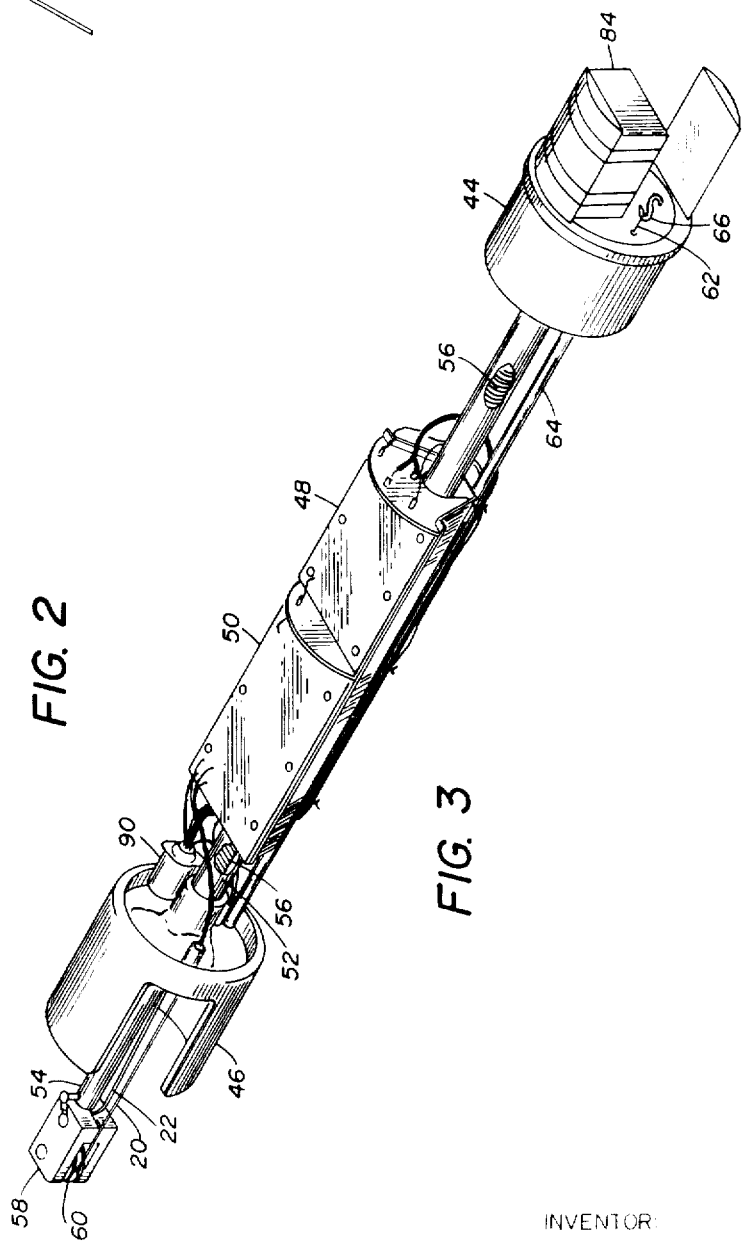

3,671,928

AUTOMATICALLY ENERGIZABLE SONOBUOY

FIELD OF THE INVENTION

This invention relates to seismic sonobuoys, and more particularly to seismic sonobuoys which automatically operate in a predetermined manner after being placed in a body of water.

THE PRIOR ART

Floating devices, termed sonobuoys, are presently commonly utilized in marine seismic exploration. A typical sonobuoy includes acoustic transducers for detecting acoustic waves and also contains radio transmitter circuitry for transmitting representations of the detected acoustic waves to a remote recording location. In operation, the sonobuoy is dropped overboard from a seismic exploration vessel and a hydrophone is suspended a predetermined distance below the floating sonobuoy housing. The seismic exploration vessel generally tows a seismic streamer cable therebehind and also employs an acoustic source, such as an air gun or the like, which periodically generates acoustic impulses. Reflections from the acoustic impulses are detected by the seismic streamer and are recorded onboard the marine vessel. Refractions from the acoustic impulses are picked up by the sonobuoy with the suspended hydrophone, and representations of the refracted energy are transmitted from the transmitter in the sonobuoy to a tuned receiver on the marine exploration vessel and recorded on tape or the like. Data obtained by such marine exploration techniques may provide basement depth determination, velocity interface mapping, fault delineation, multiple reflection identification and the like.

Previously developed sonobuoys have sometimes required prearming of certain timing circuitry or the like before launching of the sonobuoy into the water. More importantly, many prior sonobuoys have included antennas and hydrophone suspension systems which quickly operated after the sonobuoy was deposited into the water. Problems thus often occurred because of entanglement of the suspended hydrophone with the trailing seismic streamer from the marine exploration vessel. Due to the fact that many commonly used seismic streamers are in the range of 9,000 feet or more in length, a substantial period of time thus exists when entanglement of the suspended sonobuoy hydrophone with the streamer is a distinct possibility.

SUMMARY OF THE INVENTION

In accordance with the present invention, a sonobuoy is provided which includes a buoy housing containing an acoustic transducer. Structure is contained in the buoy housing for lowering the acoustic transducer from the buoy housing a predetermined period of time after the buoy housing is placed in the body of water to prevent entanglement thereof with towed objects. A radio transmitter is contained within the buoy housing for transmitting indications of acoustic signals received by the suspended acoustic transducer.

In accordance with a more specific aspect of the invention, an automatically energized sonobuoy is provided which includes a buoy housing with flotation structure. An antenna is movable from a retracted position inside the housing to an extended position outside the housing. An acoustic transducer is contained within a compartment within the housing and is attached to the housing by a flexible line. A radio transmitter is connected to the antenna for transmitting representations of acoustic signals received by the acoustic transducer. Circuitry is responsive to immersion of the housing in a body of water for moving the antenna to the extended position and for lowering the acoustic transducer from the housing into the water for a predetermined depth. Circuitry is also provided to delay the lowering of the acoustic transducer from the housing for a predetermined time after the housing is placed in the body of water.

DESCRIPTION OF THE DRAWINGS

For a more complete understanding of the present invention and for further objects and advantages thereof, reference is now made to the following descriptions taken in conjunction with the accompanying drawings, in which:

FIG. 1 is a diagrammatic illustration of a typical marine exploration procedure utilizing the present sonobuoy;

FIG. 2 is a sectional view of the present sonobuoy with the antenna in the extended position;

FIG. 3 is a perspective view of a portion of the present sonobuoy;

FIG. 4 is a perspective view of the present sonobuoy, with portions thereof broken away, with the antenna in a retracted position, and FIG. 5 is a perspective view of the lower portion of the present sonobuoy during lowering of the hydrophone assembly.

Referring to FIG. 1, a seismic exploration vessel is designated generally by the numeral 10 and is illustrated as towing therebehind a seismic streamer 12 in the conventional manner. Such streamers extend up to lengths in the range of 10,000 feet. An acoustic source 14 is towed below the vessel 10 and is operated to generate sequences of acoustic impulses. Suitable acoustic sources comprise air guns, gas exploding devices and the like. Reflections of the acoustic signals from substrata are received by the seismic streamer 12 and are recorded onboard the vessel 10 for subsequent processing according to well known techniques.

A sonobuoy 16 according to the present invention is illustrated a substantial distance from the vessel 10, which in practice may comprise a range of 8 to 12 miles. A plurality of sonobuoys 16 are sequentially deposited in the water from the vessel 10 during a traverse along a selected path. As will be later described, the sonobuoy 16 comprises a cylindrical housing which is initially cast into the water from the vessel 10 in a deactivated state. The cylindrical housing floats on the surface of the water for a predetermined time until the seismic streamer 12 has been towed past the floating sonobuoy. After the predetermined time, which may be for instance about 20 minutes, sonobuoy 16 automatically extends an antenna 20 which includes ground plane extensions 22. A lower compartment 24 of the cylindrical sonobuoy housing drops away from the main buoy housing and is maintained at a predetermined depth beneath the housing by a flexible line 26.

A hydrophone 28 is connected through a preamplifier 30 and via electrical connections through the line 26 to transmitter circuitry within the sonobuoy housing 16. A weight 32 maintains the hydrophone 28 at the selected depth. The hydrophone 28 is thus positioned to detect refraction signals generated by the acoustic source 14. The electrical output from the hydrophone 28 is transmitted via the line 26 to the transmitter circuitry within the buoy housing 16. The transmitter then transmits indications of the refraction data from the antenna 20 to suitable receiver circuitry on board the vessel 10. The representations of the refraction data are recorded on suitable recording apparatus onboard the vessel 10. The refraction data may be recorded by digital or analog circuitry and is often plotted onboard the vessel in order to enable the results of the surveys to be immediately evaluated. The plot generated onboard the vessel generally takes the form of a travel-time diagram, wherein the time is registered by a sweep recording of the returns from the acoustic source, while the distance is measured by the speed of the ship between the periodic actuation of the acoustic generator source 14.

Of particular importance with the use of the present sonobuoy is the delay built into the buoy before automatic actuation, in order that the hydrophone 28 does not become entangled with the seismic streamer 12.

The present sonobuoy may be picked up by the vessel 10 and reused, but it will generally be more economical to provide structure for scuttling of the sonobuoy 16 after a number of hours use due to the cost of retracing of the path of vessel 10.

FIG. 2 illustrates in detail the construction of the present sonobuoy 16. A main housing 40 provides an airtight compartment 42 between a lower seal member 44 and an upper seal member 46. An audio circuit is contained within the housing 48 for connecting the output of the hydrophone 28 to the transmitter circuitry contained within the housing 50. In the preferred embodiment, the transmitter circuitry contained within the housing 50 operates at about one watt at channel frequency after activation and has a frequency stability within ±25 KHz of the selected channel frequency. The audio circuitry contained within housing 48 frequency modulates the transmitter circuitry.

An antenna housing shaft 52 extends between the lower and upper seal members and slidably receives an antenna support shaft 54. The shaft 54 is hollow and contains an antenna ejection spring 56 therein. Shaft 54 carries a housing 58 on the end thereof. Housing 58 supports a coil spring 60 which is an integral part of the antenna 20. Housing 58 also supports the ground plane members 22. A release wire 62 is connected at one end to the housing 58 and extends down a tube 64 to a clip 66. Clip 66 is attached to a fastener member 68. Fastener member 68 includes a slot which receives the head 70 of bolt 72. The head 70 of the bolt 72 extends through an aperture in a circular weight member 74. Weight member 74 is attached to a lower housing assembly 76. The fastening member 68 thus maintains the connection between the lower housing assembly 76 and the main housing 40. When the fastener member 68 is pulled away from the head 70 of the bolt 72, the lowe housing assembly 76 is released as will be later described.

An electrical wire 80 leads from the transmitter circuitry to the antenna 20 to enable transmission of radio signals to the remote seismic exploration vessel. A burn wire 82 is shown in FIG. 2 in a broken condition. As will be later described, burn wire 82 serves to retain the antenna assembly within the main housing 40 until the desired release. A seawater battery 84 is attached to a leg of the lower seal member 44. When the present sonobuoy is disposed in seawater, battery 84 contacts the water and becomes energized in the well known manner. Electrical leads, not shown, connect the battery 84 to the audio circuitry, the transmitter circuitry and to the burn wire 82 through a suitable delay mechanism, as will be subsequently described. A scuttle plug 86 is disposed through the side of the housing 40 and contains salt or a suitable similar material. Upon contact with the water, the salt disintegrates the scuttle plug 86 and allows water inside the housing 40 to sink the sonobuoy. The quantity of salt placed within the scuttle plug 86 determines the length of operating time before the sonobuoy is scuttled.

FIG. 3 illustrates in perspective the upper portion of the sonobuoy with the housing 40 removed. The antenna assembly is illustrated in the process of moving from the retracted position within the housing 40 to the extended position outside the housing 40. In the retracted position of the antenna, the antenna 20 is bent around spring 60 and extends within the shaft 52. Additionally, the ground plane members 22 are bent to extend within the shaft 52. Upon release by the burn wire 82, the spring 56 pushes the shaft 54 upwardly. The antenna 20 and the ground plane members 22 then spring outwardly into the upright extended position.

Of importance is the delay device 90 mounted on the underside of the upper seal member 46. Wires extend from the delay device 90 to the battery 84 and from the delay device 90 to the burn wire 82. When the salt water battery 84 is energized, current is applied to the delay device 90. A predetermined delay then occurs before current is applied to the burn wire 82. When current is applied to the burn wire 82, the wire becomes heated and breaks, thereby allowing the antenna assembly to be extended by the force of the spring 56 to the outwardly extended position.

The delay member 90 may comprise any suitable device such as an electrolytic timer or a mechanical timer. In practice, a 20-minute delay has been found satisfactory to enable a 9,000 foot seismic streamer to be towed past the sonobuoy at approximately 5 knots.

FIG. 4 illustrates the upper portion of the sonobuoy 16, with two of the outwardly extending legs of the upper seal member 46 being eliminated for illustration purposes. The sonobuoy 16 is in the deenergized mode, with the antenna 20 and the ground plane members 22 being disposed through a slot 100 into the shaft 52 as previously described. The burn wire 82 is intact and thus restrains the antenna assembly in the retracted position. When electrical current is applied to the burn wire 82 from the delay mechanism 90, the burn wire breaks and the antenna assembly extends. During opening of the antenna assembly to the extended position, the release wire 62 is pulled upwardly to disengage the fastener device 68 from the head of the bolt 70, to thereby release the lower housing 76. Wire 80 is coiled and restrained by a flexible rubber member 102 in the deenergized mode of the sonobuoy. When the housing 58 rises to the extended position, the wire 80 is pulled away from the flexible member 102 to connect the antenna with the transmitter circuitry.

Referring again to FIG. 2, the lower housing 76 includes an ejection spring 106 for maintaining tension between the main housing 40 and the lower housing 76. The line 26, commonly termed the compliance section, is coiled within the lower housing 76. The bolt 72 is affixed at the lower end to a disc 112. The preamplifier 30 and the hydrophone 28 are disposed in the lower housing 76 and maintained in place by the disc 112.

FIG. 5 illustrates an exploded view of the dropping of the hydrophone assembly from the sonobuoy 16. The head 70 of the bolt 72 is released when fastening device 68 is pulled upwardly due to the extension of the antenna assembly. The bolt 72 then slips downwardly in the water due to the weight of the disc 112. The lower housing 76 is then released from its connection with the lower seal member 44 and begins to descend through the water. The line or compliance section 26 unreels from the lower housing assembly during the descent of the lower housing assembly 76, the hydrophone 28, preamplifier 30 and the weight 32 fall out from the bottom of the lower housing assembly 76 and extend to the position shown in FIG. 1. Also during the descent, electrical power is supplied to the hydrophone assembly and to the acoustic circuitry in order to enable the transmission of detected acoustic waves to the seismic marine vessel in the manner previously described.

Briefly summarizing the operation of the present sonobuoy, the sonobuoy 16 is placed in its deenergized mode in the water from the side of a seismic exploration vessel. The sonobuoy remains in the deenergized position for a predetermined period of time in order to prevent entanglement of the hydrophone system with the trailing seismic streamer. After the predetermined time delay, electrical power is applied from the delay device 90 to the burn wire 82. The burn wire 82 breaks and the spring 56 forces the housing 58 upwardly. The antenna 20 springs upwardly due to the coil spring 60 and the ground plane members 22 spring outwardly. Electrical power is applied to the transmitter system at this time.

As the antenna system is being erected, the wire 62 pulls the fastening device 68 outwardly away from the head 70 of the bolt 72. The lower housing assembly 76 is thus released and the entire lower housing assembly begins to descend in the water. The line 26 is unreeled during this descent and the bolt 72 and the disc member 112 falls away from the bottom of the lower housing assembly 76. The hydrophone 28, preamplifier 30 and weight 32 then descend to the desired depth for reception of acoustic or seismic signals. Representations of the detected seismic signals are transmitted by the transmitter circuitry through the antenna 20 and received by a suitable antenna aboard the seismic marine vessel.

It will be understood that certain variations may be utilized with the present invention. For instance, the antenna 20 in some instances may be allowed to be erected initially, with a time delay being provided before lowering of the hydrophone system. In this manner, initial ratio transmission may be initiated from the sonobuoy prior to lowering of the hydrophone system. In some embodiments, an anchoring system may be also lowered along with the hydrophone system.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A sonobuoy comprising:
    a buoy housing containing acoustic transducer means,
    means operable to lower said acoustic transducer means from said buoy housing a predetermined period of time after said buoy housing is placed in a body of water,
    radio transmitter means within said buoy housing for transmitting indications of acoustic signals received by said acoustic transducer means,
    battery means disposed within said housing and activated by contact with water, and
    release means for said acoustic transducer means and said antenna means being responsive to the operation of said battery means.

2. The sonobuoy of claim 1 and further comprising:
    antenna means movable from a retracted position within said housing to an extended position outside said housing.

3. The sonobuoy of claim 1 wherein the electrical output from said battery means causes the breakage of a wire restraining the release of said acoustic transducer means and said antenna means.

4. The sonobuoy of claim 1 and further comprising:
    delay means for delaying the application of the electrical output from said battery to said wire for said predetermined period of time in order that said acoustic transducer means may avoid entanglement with a towed obstacle.

5. The sonobuoy of claim 1 and further comprising:
    a flexible lead connecting said acoustic transducer means to said buoy housing,
    a lower housing attached to said buoy housing and containing said acoustic transducer means and said flexible lead,
    battery means responsive to water for generating an electrical output, and
    means responsive to said electrical output for releasing said lower housing from said buoy housing after said predetermined period of time.

6. The sonobuoy of claim 1 and further comprising:
    a spring loaded shaft mounted in the upper end of said buoy housing and operable to extend upwardly from said buoy housing after said buoy housing is disposed in a body of water,
    antenna means initially bent at the upper end thereof in order to be contained within said shaft, and
    spring means located in the upper bend portion of said antenna means wherein when said shaft is upwardly extended said antenna means swings upwardly into an extended position.

7. An automatically energized sonobuoy comprising:
    a buoy housing including flotation structure,
    antenna means movable from a retracted position inside said housing to an extended position outside said housing,
    acoustic transducer means contained within a compartment in said housing and attached to said housing by a flexible line,
    transmitter means connected to said antenna means for transmitting representations of acoustic signals received by said transducer means,
    means responsive to immersion of said housing in a body of water for moving said antenna means to said extended position and for lowering said transducer means from said housing into the water,
    means for delaying the lowering of said transducer means from said housing for a predetermined time after said housing is placed in the body of water,
    battery means disposed within said housing and activated by contact with water, and
    release means for said acoustic transducer means and said antenna means being responsive to the operation of said battery means.

8. The sonobuoy of claim 7 and further comprising:
    a wire normally restraining the release of said acoustic transducer means and said antenna means until electrical current from said battery means causes said wire to break.

9. The sonobuoy of claim 8 and further comprising:
    delay means for delaying the application of the electrical output from said battery to said wire for said predetermined period of time in order that said acoustic transducer means may avoid entanglement with a towed obstacle.

10. The sonobuoy of claim 7 and further comprising:
    a flexible lead connecting said acoustic transducer means to said buoy housing,
    a lower housing attached to said buoy housing and containing said acoustic transducer means and said flexible lead,
    battery means responsive to water for generating an electrical output, and
    means responsive to said electrical output for releasing said lower housing from said buoy housing after said predetermined period of time.

11. The sonobuoy of claim 7 wherein said transducer means is contained within a lower housing attached to the bottom of said buoy housing by fastening means,
    release means maintaining said antenna means in the retracted position,
    battery means responsive to water to generate an output signal which operates said release means for release of said antenna means, and
    means responsive to the movement of said antenna means to the extended position for actuating said fastening means to release said lower housing from said buoy housing.

* * * * *

PO-1050
(5/69)

UNITED STATES PATENT OFFICE
CERTIFICATE OF CORRECTION

Patent No. 3,671,928  Dated June 20, 1972

Inventor(s) James F. Schultz

It is certified that error appears in the above-identified patent and that said Letters Patent are hereby corrected as shown below:

Col. 3, line 31, "lowe" should be --lower--.
Col. 4, line 40, after "housing" insert --76. During the descent of the lower housing--.
Col. 5, line 1, "ratio" should be --radio--.

Signed and sealed this 10th day of October 1972.

(SEAL)
Attest:

EDWARD M. FLETCHER, JR.　　　　　ROBERT GOTTSCHALK
Attesting Officer　　　　　　　　　Commissioner of Patents